United States Patent [19]

Kleespies et al.

[11] 4,089,610
[45] May 16, 1978

[54] KIT TO CONVERT FIXED LIVE AXLE ON MOTOR VEHICLE TO LOCK-IN, LOCK-OUT POWER HUB

[76] Inventors: Richard M. Kleespies, 3780 El Camino; Fred F. Parke, 3993 Mountain Ave., both of San Bernardino, Calif. 92404

[21] Appl. No.: 796,769

[22] Filed: May 13, 1977

[51] Int. Cl.² .................... B60B 27/02; F16D 1/06; F16D 11/00
[52] U.S. Cl. .......................... 403/1; 192/50; 192/67 R; 192/89 A; 192/95; 301/128
[58] Field of Search ............... 192/67 R, 89 A, 50, 192/95; 301/128; 403/1; 308/211

[56] References Cited

U.S. PATENT DOCUMENTS

| 2,844,238 | 7/1958 | Peterson | 403/1 |
|---|---|---|---|
| 2,883,025 | 4/1959 | McKim | 403/1 |
| 3,125,363 | 3/1964 | Kapusta | 192/67 R X |
| 3,351,364 | 11/1967 | Warn et al. | 403/1 |
| 3,442,361 | 5/1969 | Hegar | 403/1 |
| 3,552,813 | 1/1971 | Brescia, Jr. et al. | 301/128 X |

Primary Examiner—Allan D. Herrmann
Attorney, Agent, or Firm—Dana E. Keech

[57] ABSTRACT

A stub axle and inner end flange which fits the outer wheel supporting flange on a fixed axle and is apertured peripherally to accept the wheel attaching bolts of said fixed axle flange, a pair of roller bearings mounted on said stub axle, the outer end of said stub axle being splined, an axle-housing hub rotatably supported on said bearings and having an inner flange, the latter having peripheral bolt holes corresponding to those in said stub axle flange and said vehicle fixed axle flange, a set of bolts for securing a drive wheel disc removed from said fixed axle flange to said stub shaft flange and a conventional wheel hub clutching mechanism mounted on the outer end of said axle housing hub, said mechanism being operable manually to optionally lock said splined stub axle to said axle housing and wheel or to disengage said stub axle to permit said housing and wheel to turn freely thereon.

2 Claims, 2 Drawing Figures

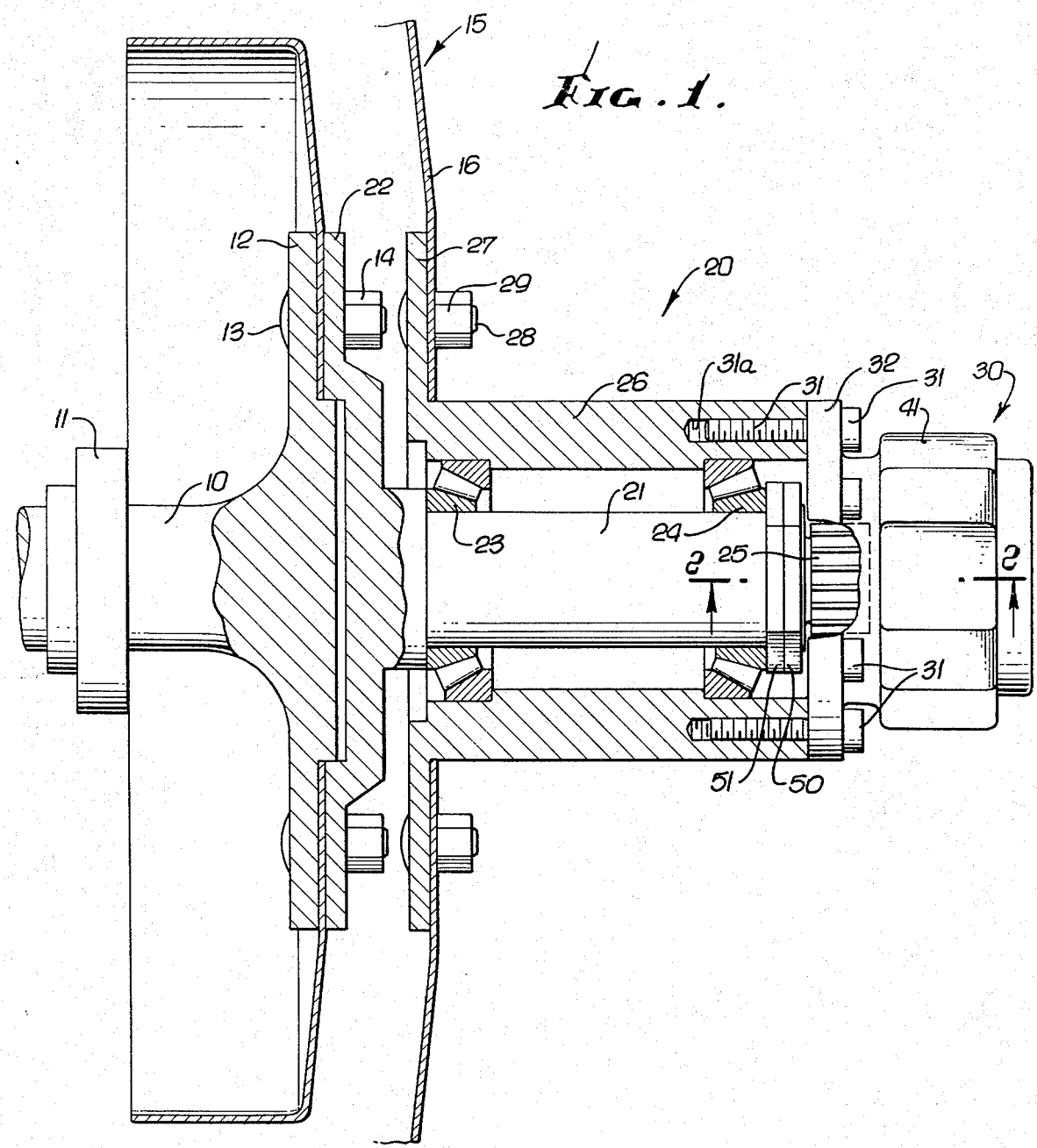

KIT TO CONVERT FIXED LIVE AXLE ON MOTOR VEHICLE TO LOCK-IN, LOCK-OUT POWER HUB

BACKGROUND ART

Presently available are many commercially manufactured lock-in, lock-out power hubs for use with floating-type axles, so that power can be applied to a wheel by simply engaging or disengaging a hub clutch. However, no such device made, or presently in use, can be used with fixed live-type axles on motor vehicles.

The typical motor vehicle with two-wheel drive comes equipped with fixed live power axles in the rear and floating free-wheeling axles in the front. Exceptions to this are front-wheel drive vehicles, (example: Oldsmobile Toronado), in which case the reverse is true.

In a typical motor vehicle equipped with four-wheel drive, the front wheels have floating-type axles. The vehicle usually comes equipped with a free-wheeling lock-in, lock-out power hub or the latter can be mounted later. Inside the free-wheeling hub are spaced bearings. The bearings are on the fixed axle housing. The free-wheeling hub is held in place by nuts threaded onto the end of the fixed shaft. The outer end of the free-wheeling hub is open, and a floating axle protrudes through the opening in the wheel hub, to make it possible for lock-in, lock-out clutch hubs to be mounted. With the lock-in, lock-out hub in place, the cap can be turned so that the wheel is either powered or released for free-wheeling.

A floating axle is one in which there is an axle, within a housing, on which the wheel turns freely. This axle is readily adapted for and often comes equipped with lock-in, lock-out power hub clutches.

A fixed live axle is one to which a wheel drum is attached directly and made part of the axle. The wheel is then attached to this drum by several lug bolts, so that the power is transmitted directly to the wheels of the vehicle.

By far the greater number of vehicles travelling the highways today are equipped with fixed live drive axles almost all of which are rear end drive axles. By far the greater portion of these vehicles are equipped with automatic transmissions and for this reason it is common practice when towing such vehicles to elevate the rear end of the vehicle when towing the same. Many of these vehicles however are too large to adopt this procedure and it is necessary before towing them to have its drive shaft disengaged or removed manually before towing the vehicle.

SUMMARY OF THE INVENTION

It is an object of the present invention to provide a kit for converting the fixed live axle on each side of an automotive vehicle so that the fixed live axle on both the right and left sides are provided with wheel hub clutching mechanisms which are readily manually controlable to exercise the option of connecting the drive wheels to the drive shaft of the vehicle or disconnecting said drive wheels therefrom so as to allow the vehicle to be readily towed whenever the occasion requires this.

It is a further object of the invention to provide such a kit which can readily be installed by the average motor vehicle owner by following a simple set of instructions accompanying the kit.

It is a still further object of the invention to provide such a kit which is relatively inexpensive and rugged in construction and which will last throughout the life of the vehicle.

BRIEF DESCRIPTION OF THE DRAWINGS

FIG. 1 is a diagrammatic vertical transverse sectional view through a preferred embodiment of the invention after this has been installed in converting a fixed live axle of an automotive vehicle to convert said axle to a lock-in, lock-out power hub.

FIG. 2 is a cross sectional view of the clutching mechanism of the kit taken on the line 2—2 of FIG. 1.

DETAILED DESCRIPTION OF THE PREFERRED EMBODIMENT

Diagrammatically illustrated in FIG. 1 is a fixed live vehicle drive axle 10 which journals in a bearing 11 suitably mounted on the frame of the vehicle, said axle terminatng at its outer end in a flange 12, said flange having a series of bolts 13 provided about its periphery, these bolts having nuts 14 on their outer ends. The rear wheel 15 of the vehicle being converted has a central sheet metal disc 16 which is provided with a series of holes adapted to accept the bolts 13 and be secured to the flange 12 by the nuts 14 being fastened down on the wheel disc 16. After this is done, in assembling the rear end of the vehicle, a sheet metal cover plate is snapped over the disc 16 so as to cover up the nuts 14 and in starting the conversion to which the present invention relates, this ornamental plated disc is removed from the wheel and the axle 10 is jacked up by a jack placed under a suitable portion of the body of the vehicle so that the wheel 15 may be removed after the nuts 14 are unscrewed from the bolts 13.

The conversion kit 20 of the invention includes a stub axle 21 having a flange 22 provided on its inner end which is of the same outside diameter as the flange 12 on the axle 10 and which is provided with a series of peripheral holes which match with the holes in the flange 12 for the bolts 13. Mounted on the stub axle 21 is a pair of roller bearings 23 and 24 and the outer end portion of the stub axle 21 is provided with splines 25.

Rotatably mounted on the bearings 23 and 24 is a wheel hub or axle housing 26 which is suitably recessed with annular recesses to receive the bearings 23 and 24 so as to lock the wheel hub 26 against axial movement relative to the stub axle 21 while allowing free rotation of the wheel hub 26 relative to said stub axle. The inner end of the wheel hub 26 has a radial flange 27 which is also of the same outside diameter as the flanges 12 and 22 aforementioned and has fixed therein on axes corresponding to the axes of the holes formed for bolts 13 a like numbered series of bolts 28 which are provided with nuts 29.

A suitable conventional wheel hub clutching mechanism 30 is secured to the outer end of wheel hub 26 by six cap screws 31 which screw into tapped holes 31a provided in said hub. While the mechanism 30 may be selected from among many similar mechanisms already on the market, the device shown in the drawings and preferable for our purposes is being presently marketed under the trademark "Selectro" by the Selectro Co. located in Denver, Co.

The hub clutching device 30 is a self-contained manually controlled clutch having an annular base 32 which receives screws 31 and is tightly secured thereby to wheel hub 26. Base 32 has an annular centering rib 33 extending into wheel hub 26 to center mechanism 30 thereon. Starting just within rib 33, the annular clutch base 32 has internal splines 34. Pressed into the inner end of splines 34 so as to lodge therein is a bearing ring 35 in which a sleeve 36 journals freely, said sleeve having internal splines 37 which slideably mesh with splines 25 on stub axle 21. Base 32 extends outwardly a quarter of an inch beyond internally splined sleeve 36 and a front end portion of sleeve 36 also has external splines 38.

The base 32 has an annular external radial groove 39 near its front end to receive screws 40 from an internally cylindrical cap 41, to rotatably mount said cap on said base, for use in clutching or declutching the mechanism 30.

Enclosed within cap 41 is an internally and externally splined clutch tube 42 which is poised at the mouth of base 32 and spring biased by a coil spring 43 into joint meshing engagement with the internal splines 34 of base 32 and the external splines 38 on the front end of axle fitting sleeve 36.

The clutch tube 42 has three cam follower pins 44 extending radially outwardly at equally spaced intervals (120°) therefrom. Secured by radial screws 45 to the inner face of cap 41 is a triple phase cylindrical sheet metal cam 46 which, when rotated 120° in a counter-clockwise direction by turning cap 41, compresses spring 43 and declutches mechanism 30, as shown in FIG. 2. A one-third reverse rotation of cap 41 releases the spring 43 allowing it to lock the clutch mechanism 30 with this uniting vehicle drive axle 10 to the vehicle wheel disc 16.

When the mechanism 30 is thus de-clutched, as shown in FIG. 2, the internally and externally splined sleeve 36, although always spline connected to stub axle 21, is left freely rotatable within its mounting bearing 35 so that the wheel hub 26 is free to rotate on the bearings 23 and 24.

The final step of conversion of rear axle 10 to equip this axle with the invention 20, consists in removing the nuts 29 from the bolts 28, placing the wheel 15 with its mounting holes in its flange 16 over the bolts 28 turning the nuts 29 on said bolts until these are tightened to rigidly mount the wheel 15 on the annular flange 27 of the wheel hub 26, and de-jacking the vehicle returning said wheel to the ground.

It is to be noted that stub axle 21 is threaded to splines 25 to receive nuts 50 and 51 which lock the bearing 24 in place on stub axle 21.

The claims are:

1. A kit for converting a fixed live axle on a motor vehicle to a lock-in lock-out power hub wherein the outer end of said live axle terminates in a brake drum supporting flange provided peripherally with a series of bolt holes and bolts inserted therein and on which a drive wheel disc is normally fixed by said bolts, the combination of:
    a relatively short stub axle provided at its inner end with a flange which is perforated at its periphery to replace said drive wheel disc and be secured by the aforesaid bolts to said vehicle fixed axle flange;
    a tubular wheel hub having a flange extending radially from its inner end, said flange corresponding in diameter and having bolt holes positioned therein correspondingly to the bolt holes in said previously recited flanges;
    a set of bolts for securing said wheel hub flange to said drive wheel disc; and
    bearing means rotatably mounting said tubular wheel hub on said stub axle and providing for free rotation of said hub on said axle while limiting axial movement thereon;
    said tubular wheel hub having bolt hole means on its outer end for use in securing a hub clutching mechanism thereto;
    said stub shaft having spline means formed on its outer end for engaging said mechanism to provide an optional lock-in, lock-out drive clutching connection between said stub shaft and said wheel hub.

2. A combination as recited in claim 1 wherein
    said bearing means comprises a pair of axially spaced roller bearings and opposed shoulder means provided on said stub axle and on said wheel hub which secures said roller bearings in fixed axially spaced relation and prevents endwise shifting of said wheel hub on said stub axle while permitting free rotation of said wheel hub when said hub clutching mechanism is disengaged.

* * * * *

UNITED STATES PATENT OFFICE
CERTIFICATE OF CORRECTION

Patent No. 4,089,610        Dated    May 16, 1978

Inventor(s)  Richard M. Kleespies et al.

It is certified that error appears in the above-identified patent and that said Letters Patent are hereby corrected as shown below:

Figure 2 should be inserted as shown on the attached sheet.

Signed and Sealed this

Ninth Day of January 1979

[SEAL]

Attest:

RUTH C. MASON
Attesting Officer

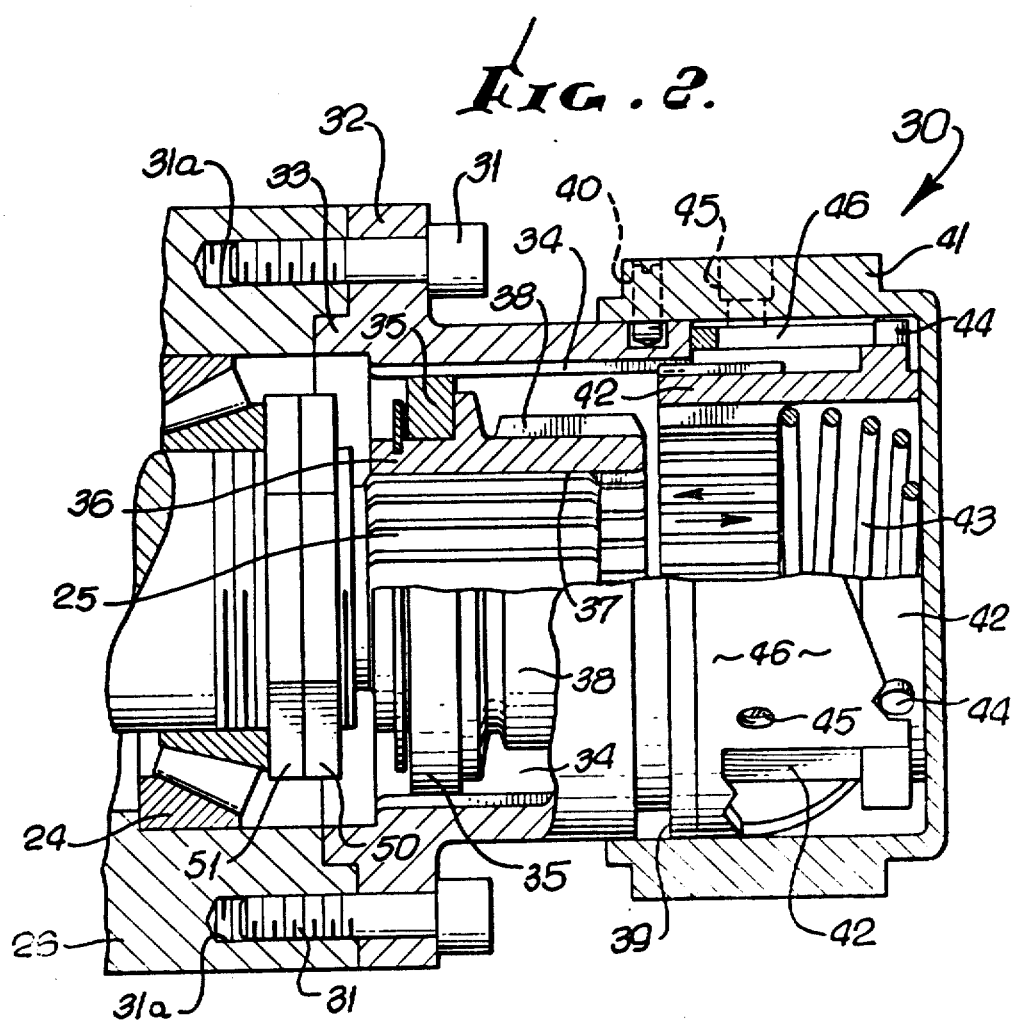

DONALD W. BANNER
Commissioner of Patents and Trademarks